(12) United States Patent
Ary

(10) Patent No.: US 8,505,580 B2
(45) Date of Patent: Aug. 13, 2013

(54) REVERSING VALVE

(75) Inventor: James Glenn Ary, Greenfield, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 495 days.

(21) Appl. No.: 12/793,954

(22) Filed: Jun. 4, 2010

(65) Prior Publication Data

US 2010/0307607 A1  Dec. 9, 2010

Related U.S. Application Data

(60) Provisional application No. 61/183,999, filed on Jun. 4, 2009.

(51) Int. Cl.
*F16K 11/085* (2006.01)
*F25B 41/04* (2006.01)

(52) U.S. Cl.
USPC ................... 137/625.43; 62/324.6

(58) Field of Classification Search
USPC .................. 137/625.22, 625.43; 62/324.6
See application file for complete search history.

(56) References Cited

U.S. PATENT DOCUMENTS

| | | | |
|---|---|---|---|
| 189,400 A * | 4/1877 | Tumy | 137/625.43 |
| 2,927,606 A | 3/1960 | Matchett, Jr. et al. | |
| 2,983,286 A | 5/1961 | Greenawalt et al. | |
| 3,400,736 A | 9/1968 | Bastle et al. | |
| 3,894,561 A | 7/1975 | Thornbery | |
| 3,952,537 A | 4/1976 | Aoki et al. | |
| 4,139,355 A * | 2/1979 | Turner et al. | 62/324.6 |
| 4,203,469 A * | 5/1980 | Gates | 137/625.43 |
| 4,213,483 A | 7/1980 | Bauer | |
| 4,231,228 A * | 11/1980 | Galvin et al. | 62/77 |
| 4,248,058 A | 2/1981 | Bauer et al. | |
| 4,255,939 A | 3/1981 | Ou | |
| 4,290,453 A | 9/1981 | Bauer | |
| 4,573,497 A | 3/1986 | White | |
| 4,760,709 A | 8/1988 | Aoki et al. | |
| 4,913,183 A * | 4/1990 | Vogel et al. | 137/15.08 |
| 5,787,930 A * | 8/1998 | Toyama | 137/625.43 |
| 6,234,207 B1 * | 5/2001 | Toyama | 137/625.43 |
| 6,289,931 B1 | 9/2001 | Sisk et al. | |
| 6,684,651 B1 | 2/2004 | Yoshizawa et al. | |
| 6,698,452 B2 | 3/2004 | Sisk et al. | |
| 2004/0060308 A1 | 4/2004 | Yoshizawa et al. | |
| 2006/0108011 A1 | 5/2006 | George et al. | |

FOREIGN PATENT DOCUMENTS

JP   61048675   10/1986

* cited by examiner

*Primary Examiner* — John Fox
(74) *Attorney, Agent, or Firm* — Thomas G. Fistek; Robert J. Clark

(57) ABSTRACT

A reversing valve is provided having a generally cylindrical valve housing and a rotatable valve body positioned within at least partially within the housing, the valve body has a first fluid pathway and a second fluid pathway, each fluid pathway generally shaped as a "y" such that there are six openings into the body. A motor rotates the body to align the fluid pathways of the body with four openings in the housing in a first position and rotates the body 180 degrees to a second position aligning the fluid pathways of the body with four openings in the housing in a manner allowing reverse flow through the valve. At least one opening of each fluid pathway is blocked by the housing when the body is in either the first or second position.

20 Claims, 3 Drawing Sheets

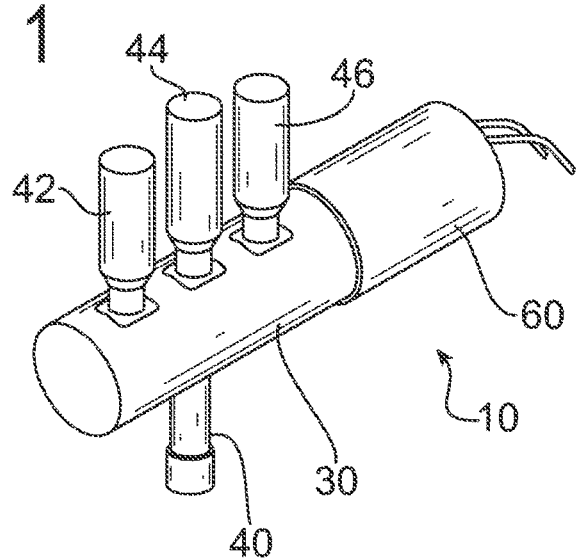
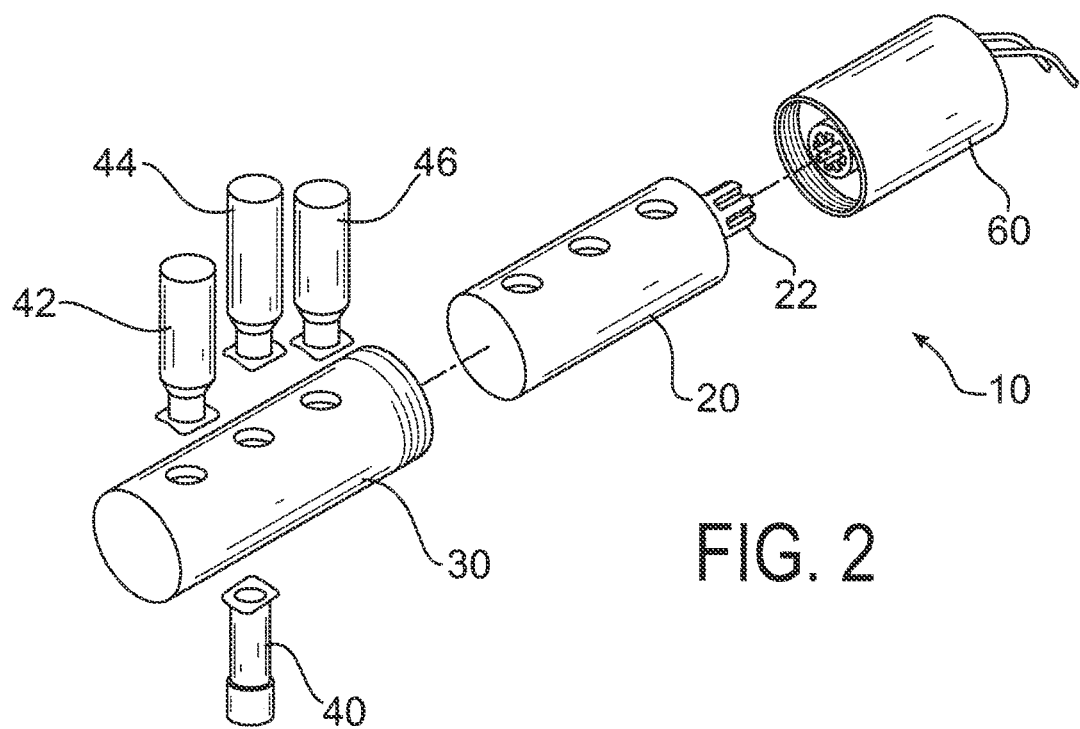

REVERSING VALVE

CROSS-REFERENCE TO RELATED CASES

This application claims the benefit of U.S. Provisional Patent Application Serial No. 61/183,999; filed Jun. 4, 2009, the disclosure of which is expressly incorporated herein by reference.

TECHNICAL FIELD

The present invention relates to a reversing valve of the type used in a refrigeration system.

BACKGROUND

The typical reversing valve has an internal sliding Teflon® bar that serves as a pilot valve. This pilot valve operates in two positions creating two different flow paths. The setting of the pilot valve is created by low pressure differentials bled to both ends of the pilot valve chamber by high and low side refrigerant pressure which causes the bar to push or pull into position. The pressure regulation to the valve chamber is driven by an external solenoid valve.

SUMMARY

At least one embodiment of the invention provides a reversing valve comprising: a generally cylindrical valve housing having an open end and having a first opening, a second opening, a third opening, and a fourth opening; a valve body positioned at least partially within the cylindrical valve housing, the valve body having a first fluid pathway and a second fluid pathway, each fluid pathway generally shaped as a "y"; a motor operatively connected to the valve body to rotate the valve body between a first position and a second position; wherein the first fluid pathway connects the first opening to the second opening and the second fluid pathway connects the third opening to the fourth opening when the valve body is in the first position; wherein the first fluid pathway connects the second opening to the third opening and the second fluid pathway connects the first opening to the fourth opening when the valve body is in the second position.

At least one embodiment of the invention provides a reversing valve comprising: a valve housing having an open end and having a first opening, a second opening, a third opening, and a fourth opening; a valve body positioned at least partially within open end of the valve housing, the valve body having a first fluid pathway and a second fluid pathway, each fluid pathway generally shaped as a "y"; a motor attached to the open end of the valve housing, the motor operatively connected to the valve body to rotate the valve body between a first position and a second position; when the valve body is in the first position, the first fluid pathway connects the first opening to the second opening and the second fluid pathway connects the third opening to the fourth opening; when the valve body is in the second position, the first fluid pathway connects the second opening to the third opening and the second fluid pathway connects the first opening to the fourth opening.

At least one embodiment of the invention provides a reversing valve comprising: a cylindrical valve housing having an open end and having a first opening, a second opening, a third opening, and a fourth housing opening; a valve body positioned at least partially within open end of the valve housing, the valve body having a first fluid pathway generally shaped as a "y", the first fluid pathway has a first, a second, and a third opening in the body, the valve body also having a second fluid pathway, the second fluid pathway has a first, a second, and a third opening in the body; a motor attached to the open end of the valve housing, the motor operatively connected to the valve body to rotate the valve body between a first position and a second position; when the valve body is in the first position, the first fluid pathway connects the first housing opening to the second housing opening and the second fluid pathway connects the third housing opening to the fourth housing opening; when the valve body is in the second position, the first fluid pathway connects the second housing opening to the third housing opening and the second fluid pathway connects the first housing opening to the fourth housing opening.

BRIEF DESCRIPTION OF THE DRAWINGS

Embodiments of this invention will now be described in further detail with reference to the accompanying drawings, in which:

FIG. 1 is a perspective view of an embodiment of a reversing valve in accordance with the present invention;

FIG. 2 is an exploded, perspective view of the reversing valve shown in FIG. 1;

DETAILED DESCRIPTION

Figure 3:
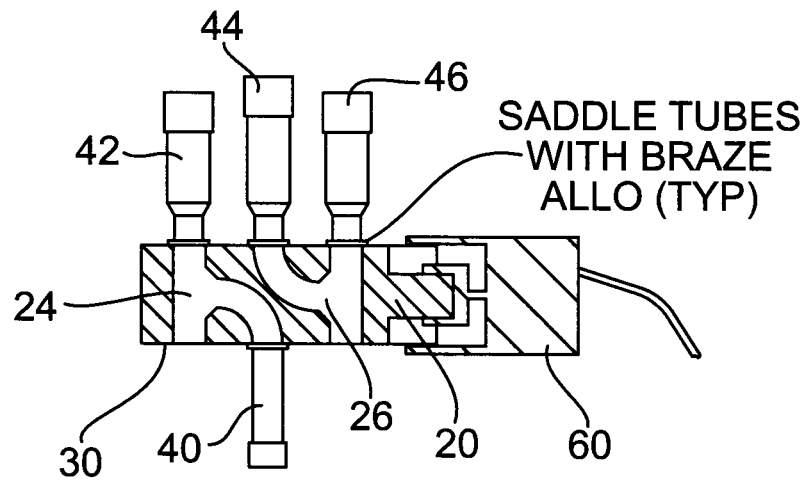
FIG. 3 is a cross-sectional view of the reversing valve shown in FIG. 1.
Figure 4:
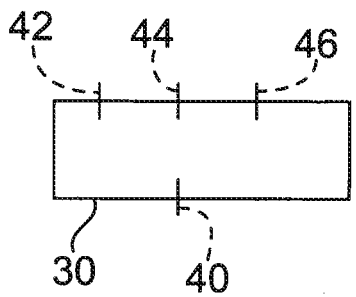
FIG. 4 is a cross-sectional view of the brass body cover of the reversing valve shown in FIG. 1.
Figure 5:
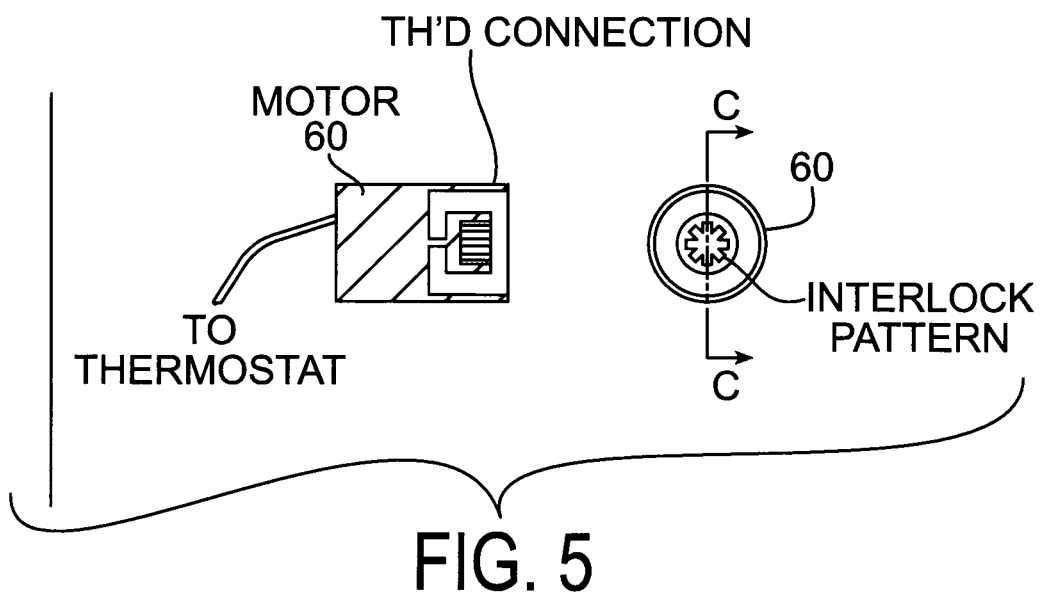
FIG. 5 is a cross-sectional view of the motor of the reversing valve shown in FIG. 1 and an end view of the motor is shown adjacent the cross-sectional view.

An embodiment of the present invention is shown in FIGS. 1-3 as a reversing valve 10. The reversing valve 10 comprises a valve body 20, which is inserted into a brass housing 30. The valve body 20 is formed with an interlock 22 so that the valve body 20 can be rotated by an electrical motor drive 60. The valve body 20 is formed with standard flow paths 24, 26 which selectively connect with openings in the brass housings, said openings shown herein covered with saddle tubes 40, 42, 44, and 46 which allow reversing of the flow in the system as discussed in detail below.

Figure 6A:
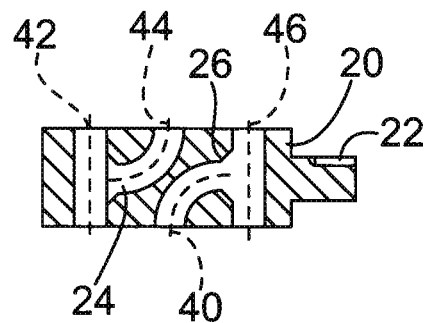
FIG. 6A is a cross-sectional view of the valve body shown in a first position.
Figure 6B:
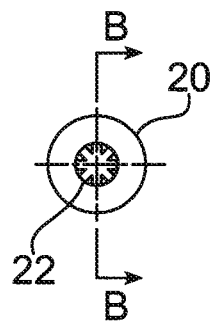
FIG. 6B is an end view of the interlock of the valve body.
Figure 6C:
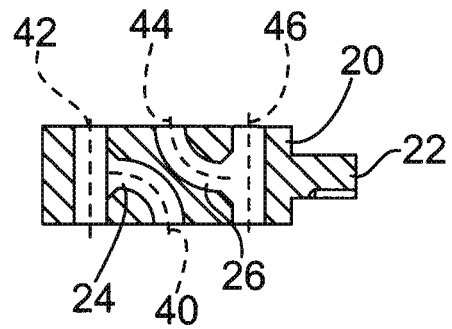
FIG. 6C is a cross-sectional view of the valve body shown in a second position.

In operation, fluid flows through the valve 10 with the body 20 in a first position as shown in FIG. 6A, such that the fluid flows though openings 40 and 42 (saddle tubes not shown) connected by flow path 24 and fluid flows though openings 44 and 46 (saddle tubes not shown) connected by flow path 26. When the thermostat is switched to reverse the heating or cooling mode of operation, an electrical signal is sent to the motor drive 60 to rotate the valve body 20 to a second position as shown in FIG. 6C such that the fluid flows though openings 42 and 44 (saddle tubes not shown) connected by flow path 24 and fluid flows though openings 40 and 46 (saddle tubes not shown) connected by flow path 26.

The body 20 is generally cylindrical and is sized to be at least partially inserted into the cylindrical housing 30 such that no flow is permitted between the outer cylindrical surface of the body 20 and the interior cylindrical surface of the housing 30. The standard flow paths 24, 26 are each generally formed as a "y". Accordingly, the body 20 has six inlet/outlets while the housing 30 has only four inlet/outlets—such that two inlet/outlets of the body 20 are blocked and sealed by the housing 30 in each of the two operating conditions of the reversing valve 10. The reversing valve components can be made of any suitable material and are not limited to any discussed herein. For example, the valve body can be made of nylon material.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention.

What is claimed is:

1. A reversing valve comprising:
   a longitudinal valve housing having a first opening, a second opening, a third opening, and a fourth opening, the openings being distributed along a longitudinal extent of the valve housing, wherein the second opening, the third opening, and the fourth opening in the valve housing are distributed along an axis that is parallel to a longitudinal axis of the valve body;
   a valve body positioned at least partially within the longitudinal valve housing, the valve body having a first fluid pathway and a second fluid pathway; and
   a motor operatively connected to the valve body to rotate the valve body between a first position in which the first fluid pathway connects the first opening to the second opening and the second fluid pathway connects the third opening to the fourth opening and a second position in which the first fluid pathway connects the second opening to the third opening and the second fluid pathway connects the first opening to the fourth opening.

2. The reversing valve of claim 1 further comprising a first saddle tube attached to the first opening in the valve housing, a second saddle tube attached to the second opening in the valve housing, a third saddle tube attached to the third opening in the valve housing, and a fourth saddle tube attached to the fourth opening in the valve housing.

3. The reversing valve of claim 2 wherein the first saddle tube extends from the valve housing in a first direction, and the second saddle tube, the third saddle tube and the fourth saddle tube extend from the valve housing in a second direction.

4. The reversing valve of claim 1 wherein the valve body has an integral coupling mated with a corresponding coupling of the motor.

5. The reversing valve of claim 1 wherein the valve body includes a first opening to the first fluid pathway, a second opening to the first fluid pathway, and a third opening to the first fluid pathway.

6. The reversing valve of claim 5 wherein the first opening to the first fluid pathway and the second opening to the first fluid pathway are spaced circumferentially 180 degrees from the third opening to the first fluid pathway.

7. The reversing valve of claim 1 wherein the valve body includes a first opening to the second fluid pathway, a second opening to the second fluid pathway, and a third opening to the second fluid pathway.

8. The reversing valve of claim 7 wherein the first opening to the second fluid pathway and second opening to the second fluid pathway are spaced circumferentially 180 degrees from the third opening to the second fluid pathway.

9. The reversing valve of claim 1 wherein the first fluid pathway and the second fluid pathway are generally shaped as a "y".

10. A reversing valve comprising:
    a valve housing having an open end and having a first opening, a second opening, a third opening, and a fourth opening;
    a valve body positioned at least partially within the open end of the valve housing, the valve body having a first fluid pathway and a second fluid pathway;
    a motor attached to the open end of the valve housing, the motor operatively connected to the valve body to rotate the valve body between a first position and a second position;
    when the valve body is in the first position, the first fluid pathway connects the first opening to the second opening and the second fluid pathway connects the third opening to the fourth opening;
    when the valve body is in the second position, the first fluid pathway connects the second opening to the third opening and the second fluid pathway connects the first opening to the fourth opening;
    wherein the valve body has a first opening, a second opening, and a third opening to the first fluid pathway; and
    wherein the first opening and second opening to the first fluid pathway are spaced circumferentially 180 degrees from the third opening to the first fluid pathway.

11. The reversing valve of claim 10 further comprising a first saddle tube attached to the first opening in the valve housing, a second saddle tube attached to the second opening in the valve housing, a third saddle tube attached to the third opening in the valve housing and a fourth saddle tube attached to the fourth opening in the valve housing.

12. The reversing valve of claim 10 wherein the body has an integral coupling mated with a corresponding coupling of the motor.

13. The reversing valve of claim 10 wherein the second fluid pathway has a first, a second, and a third opening in the valve body.

14. The reversing valve of claim 13 wherein the first and second openings of the second fluid pathway are spaced circumferentially 180 degrees from the third opening of the second fluid pathway.

15. The reversing valve of claim 10 wherein the first fluid pathway and the second fluid pathway are generally shaped as a "y".

16. A reversing valve comprising:
    a valve housing having an open end and having a first housing opening, a second housing opening, a third housing opening, and a fourth housing opening;
    a longitudinal valve body positioned at least partially within the open end of the valve housing, the valve body having a first fluid pathway, a first opening to the first fluid pathway, a second opening to the first fluid pathway, and a third opening to the first fluid pathway, the openings to the first fluid pathway being distributed along a longitudinal extent of the valve body, the valve body having a second fluid pathway, a first opening to the second fluid pathway, a second opening to the second fluid pathway, and a third opening to the second fluid pathway, the openings to the second fluid pathway being distributed along the longitudinal extent of the body; and
    a motor attached to the open end of the valve housing, the motor operatively connected to the valve body to rotate the valve body between a first position and a second position;

wherein when the valve body is in the first position, the first fluid pathway connects the first housing opening to the second housing opening and the second fluid pathway connects the third housing opening to the fourth housing opening, and when the valve body is in the second position, the first fluid pathway connects the second housing opening to the third housing opening and the second fluid pathway connects the first housing opening to the fourth housing opening; and wherein the first and second openings to the second fluid pathway are spaced circumferentially 180 derees from the third opening to the second fluid pathway.

17. The reversing valve of claim 16 herein the body has an integral coupling mated with a corresponding coupling of the motor.

18. The reversing valve of claim 16 wherein the first and second openings to the first fluid pathway are spaced circumferentially 180 degrees from the third opening to the first fluid pathway.

19. The reversing valve of claim 16 wherein at least one opening to the first fluid pathway and at least one opening to the second fluid pathway are blocked by the valve housing when the valve body is in either the first position or second position.

20. The reversing valve of claim 16 wherein the first fluid pathway and the second fluid pathway are generally shaped as a "y".

* * * * *